United States Patent
Chung et al.

(10) Patent No.: US 9,977,946 B2
(45) Date of Patent: May 22, 2018

(54) FINGERPRINT SENSOR APPARATUS AND METHOD FOR SENSING FINGERPRINT

(71) Applicant: Novatek Microelectronics Corp., Hsinchu (TW)

(72) Inventors: Hsing-Lung Chung, Miaoli County (TW); Ding-Teng Shih, Taoyuan (TW); Yu-Chao Hsu, Kaohsiung (TW); Wang-Sheng Hsu, Miaoli County (TW); Hsin-Kuo Chen, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days. days.

(21) Appl. No.: 15/255,158

(22) Filed: Sep. 2, 2016

(65) Prior Publication Data
US 2017/0323142 A1    Nov. 9, 2017

Related U.S. Application Data

(60) Provisional application No. 62/330,867, filed on May 3, 2016.

(51) Int. Cl.
*G06K 9/00* (2006.01)
*G06T 7/00* (2017.01)

(52) U.S. Cl.
CPC ..... *G06K 9/00026* (2013.01); *G06K 9/00912* (2013.01); *G06T 7/0002* (2013.01)

(58) Field of Classification Search
CPC ........... G06K 9/00019; G06K 9/00026; G06K 9/00084; G06K 9/00065; G06K 9/00013
See application file for complete search history.

(56) References Cited

U.S. PATENT DOCUMENTS

| | | | | |
|---|---|---|---|---|
| 7,236,617 | B1* | 6/2007 | Yau | G06K 9/00026 382/125 |
| 7,474,772 | B2* | 1/2009 | Russo | G06F 3/033 345/157 |
| 7,697,729 | B2* | 4/2010 | Howell | G06K 9/00013 345/156 |
| 7,831,070 | B1* | 11/2010 | Cheng | G06K 9/00013 382/124 |
| 9,483,679 | B2* | 11/2016 | Neskovic | G06K 9/00026 |
| 9,760,753 | B2* | 9/2017 | Bechtel | G06K 9/0002 |
| 2002/0146178 | A1* | 10/2002 | Bolle | G06K 9/00067 382/254 |
| 2003/0021451 | A1* | 1/2003 | Lee | G06K 9/00026 382/124 |
| 2006/0285729 | A1* | 12/2006 | Kim | G06K 9/00026 382/124 |
| 2017/0006223 | A1* | 1/2017 | Hargreaves | G06K 9/00067 |

* cited by examiner

*Primary Examiner* — Amir Alavi
(74) *Attorney, Agent, or Firm* — JCIPRNET

(57) ABSTRACT

A fingerprint sensor apparatus including a fingerprint sensor and a processor circuit is provided. The fingerprint sensor is configured to capture a plurality of local fingerprint images of a fingerprint. The plurality of local fingerprint images include at least one first local fingerprint image and at least one second local fingerprint image. The processor circuit is electrically connected to the fingerprint sensor. The processor circuit is configured to identify the fingerprint according to the at least one first local fingerprint image of the local fingerprint images. The local fingerprint images form a global fingerprint image of the fingerprint. In addition, a method for sensing a fingerprint is also provided.

18 Claims, 6 Drawing Sheets

500

FINGERPRINT SENSOR APPARATUS AND METHOD FOR SENSING FINGERPRINT

CROSS-REFERENCE TO RELATED APPLICATION

This application claims the priority benefits of U.S. provisional application Ser. No. 62/330,867, filed on May 3, 2016. The entirety of the above-mentioned patent application is hereby incorporated by reference herein and made a part of this specification.

BACKGROUND OF THE INVENTION

1. Field of the Invention

The invention generally relates to a sensor apparatus and a method for sensing an object, in particular, to a fingerprint sensor apparatus and a method for sensing a fingerprint.

2. Description of Related Art

In common technology, when a user wants to use a fingerprint sensor apparatus to identify a finger of the user, the user may use the fingerprint sensor apparatus to execute an enrolment process to enroll a fingerprint of the finger, such that fingerprint images of the finger is stored into the fingerprint sensor apparatus. After finishing the enrolment process, the fingerprint sensor apparatus may use the stored fingerprint images to identify the finger of the user.

Because the size of a fingerprint sensor of the fingerprint sensor apparatus may be smaller than a complete fingerprint, the user may use the finger to perform a plurality of touch operations, such that the fingerprint sensor apparatus obtains enough fingerprint images to identify the user's fingerprint. However, in related art, the fingerprint sensor apparatus does not clearly show information or locations about the fingerprint images which are already captured or the fingerprint images which are not captured during the enrolment process. In this way, the user does not clearly know how to move the finger, such that the fingerprint sensor apparatus captures the fingerprint images which are not captured in the touch operations. Therefore, the user may perform a lot of touch operations before finishing the enrolment process.

Hence, how to provide a fingerprint sensor apparatus that has a good user experience and satisfactory sensing quality without performing too many touch operations by the user is one of the most important topics in the pertinent field.

SUMMARY OF THE INVENTION

Accordingly, the invention is directed to a fingerprint sensor apparatus and a method for fingerprint sensing, capable of providing a good user experience and reducing the number of touch operations during the process of fingerprint enrolment.

An embodiment of the invention provides a fingerprint sensor apparatus including a fingerprint sensor and a processor circuit. The fingerprint sensor is configured to capture a plurality of local fingerprint images of a fingerprint. The plurality of local fingerprint images include at least one first local fingerprint image and at least one second local fingerprint image. The processor circuit is configured to identify the fingerprint according to the at least one first local fingerprint image of the local fingerprint images. The local fingerprint images form a global fingerprint image of the fingerprint.

In an embodiment of the invention, the fingerprint sensor apparatus includes a notification device. The notification device is electrically connected to the processor circuit. The notification device is configured to output a first notification signal to a user. The first notification signal indicates where a first location of the at least one first local fingerprint image and a second location of the at least one second local fingerprint image locate in the global fingerprint image.

In an embodiment of the invention, the notification device outputs a second notification signal including a direction information. The direction information prompts a user of the fingerprint to move a finger of the fingerprint such that the fingerprint sensor captures the at least one second local fingerprint image according to the second notification signal.

In an embodiment of the invention, the first notification signal and the second notification signal are selected from at least one of a screen notification, a sound notification and a vibrating alert.

In an embodiment of the invention, after the operation of capturing the at least one second local fingerprint image according to the second notification signal, the processor circuit determines whether at least one third local fingerprint image of the at least one second local fingerprint image is clear. If the at least one third local fingerprint image is clear, the processor circuit adds the at least one third local fingerprint image to the at least one first local fingerprint image.

In an embodiment of the invention, the fingerprint sensor apparatus includes a storage device. The storage device is electrically connected to the processor circuit. The processor circuit determines whether a number of the at least one first local fingerprint image is greater than a threshold. If the number of the at least one first local fingerprint image is greater than the threshold, the processor circuit finishes capturing the at least one second local fingerprint image and stores the at least one first local fingerprint image into the storage device.

In an embodiment of the invention, after the operation of capturing the at least one second local fingerprint image according to the second notification signal, the processor circuit determines whether at least one third local fingerprint image of the at least one second local fingerprint image is clear. If the at least one third local fingerprint image is not clear, the processor circuit controls the notification device to output a third notification signal to prompt the user to press by the finger again such that the fingerprint sensor captures the at least one second local fingerprint image.

In an embodiment of the invention, the processor circuit computes a degree of clarity for each of the at least one first local fingerprint image and the at least one second local fingerprint image.

In an embodiment of the invention, the fingerprint sensor apparatus includes a notification device. The notification device is electrically connected to the processor circuit. The notification device is configured to output the degree of clarity for each of the at least one first local fingerprint image and the at least one second local fingerprint image.

In an embodiment of the invention, wherein a number of pixels of the global fingerprint image is larger than a number of pixels of the fingerprint sensor.

An embodiment of the invention provides a method for sensing a fingerprint. The method is adapted to a fingerprint sensor apparatus. The method includes: capturing a plurality of local fingerprint images of the fingerprint, where the plurality of local fingerprint images include at least one first local fingerprint image and at least one second local fingerprint image; and identifying the fingerprint according to the at least one first local fingerprint image of the local fingerprint images, where the local fingerprint images form a global fingerprint image of the fingerprint.

In an embodiment of the invention, the method further includes: outputting a first notification signal to a user. The first notification signal indicates where a first location of the at least one first local fingerprint image and a second location of the at least one second local fingerprint image locate in the global fingerprint image.

In an embodiment of the invention, the method further includes: outputting second notification including a direction information. The direction information prompts a user of the fingerprint to move a finger of the fingerprint such that the fingerprint sensor apparatus captures the at least one second local fingerprint image according to the second notification signal.

In an embodiment of the invention, the first notification signal and the second notification signal are selected from at least one of a screen notification, a sound notification and a vibrating alert.

In an embodiment of the invention, after the step of capturing the at least one second local fingerprint image according to the second notification signal, the method further includes: determining whether at least one third local fingerprint image of the at least one second local fingerprint image is clear; and if the at least one third local fingerprint image is clear, adding the at least one third local fingerprint image to the at least one first local fingerprint image.

In an embodiment of the invention, the method further includes: determining whether a number of the at least one first local fingerprint image is greater than a threshold; and if the number of the at least one first local fingerprint image is greater than the threshold, finishing capturing the at least one second local fingerprint image and storing the at least one first local fingerprint image into the storage device.

In an embodiment of the invention, wherein after the step of capturing the at least one second local fingerprint image according to the second notification signal, the method further includes: determining whether at least one third local fingerprint image of the at least one second local fingerprint image is clear; and if the at least one third local fingerprint image is not clear, outputting a third notification signal to prompt the user to press by the finger again such that a fingerprint sensor of the fingerprint sensor apparatus captures the at least one second local fingerprint image.

In an embodiment of the invention, the method further includes: computing a degree of clarity for each of the at least one first local fingerprint image and the at least one second local fingerprint image.

In an embodiment of the invention, the method further includes: outputting the degree of clarity for each of the at least one first local fingerprint image and the at least one second local fingerprint image.

In an embodiment of the invention, the number of pixels of the global fingerprint image is larger than the number of pixels of a fingerprint sensor of the fingerprint sensor apparatus.

Based on the above, in exemplary embodiments of the invention, the fingerprint sensor apparatus and the method for fingerprint sensing provide a good user experience and reducing the number of touch operations during the process of a fingerprint enrolment.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
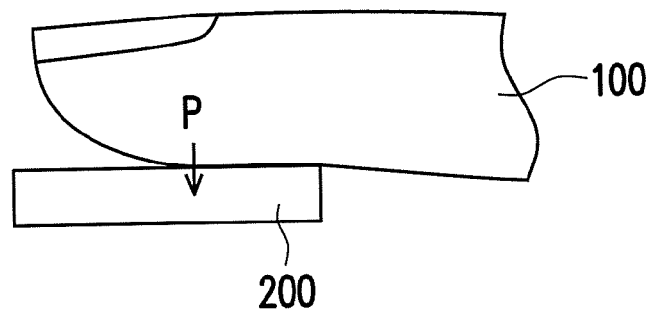
FIG. 1 illustrates a schematic diagram of a fingerprint sensor apparatus touched by a user according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The following will describe some embodiments as examples of the invention. However, it should be noted that the invention is not limited to the disclosed embodiments. Moreover, some embodiments may be combined where appropriate. The term "couple" used throughout this specification (including the claims) may refer to any direct or indirect connection means. For example, if it is described that the first device is coupled to the second device, it should be understood that the first device may be directly connected to the second device or indirectly connected to the second device through other devices or certain connection means. In addition, the term "signal" may stand for at least one current, voltage, electric charge, temperature, data, electromagnetic wave, or any other signal or signals.

Figure 2:
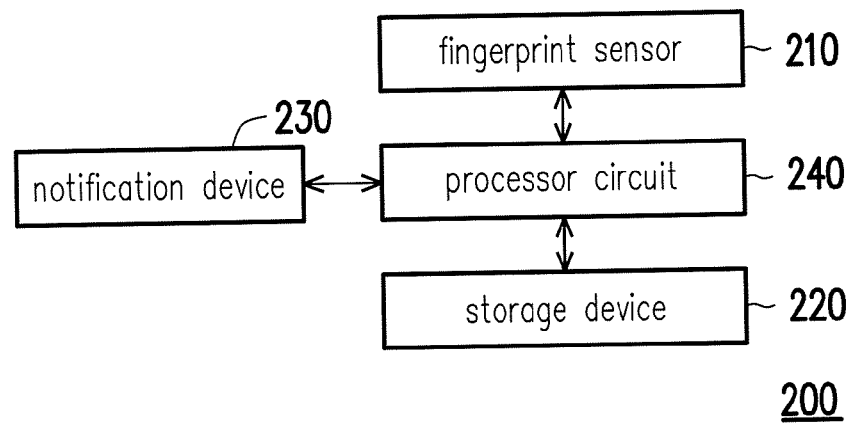
FIG. 2 illustrates a block diagram of the fingerprint sensor apparatus depicted in FIG. 1 according to an embodiment of the invention.

FIG. 1 illustrates a schematic diagram of a fingerprint sensor apparatus touched by a user according to an embodiment of the invention. FIG. 2 illustrates a block diagram of the fingerprint sensor apparatus depicted in FIG. 1 according to an embodiment of the invention. Referring to FIG. 1 to FIG. 2, an electronic device of the present embodiment may include the fingerprint sensor apparatus 200 as illustrated in FIG. 2 for sensing a fingerprint of a user 100. The electronic device may be a smartphone, a phablet, a tablet, a smartwatch, or a smart band. Nevertheless, the invention is not intended to limit the type of the electronic device.

In the present embodiment, the fingerprint sensor apparatus 200 includes a fingerprint sensor 210, a storage device 220, a notification device 230 and a processor circuit 240. The fingerprint sensor 210 is configured to sense or capture a fingerprint image, and may include an image sampling circuit and a sensor circuit. In the present exemplary embodiment, the sensor circuit includes, for example, a charge coupled device image sensor (CCD image sensor) or a complementary metal oxide semiconductor (CMOS) image sensor or the like, which are not particularly limited by the invention. In the present embodiment, the image sampling circuit may be implemented by using any image sampling circuit in the related art, which are not particularly limited by the invention. Therefore, enough teaching, suggestion, and implementation illustration for internal circuit structures and implementations of the image sampling circuit and the sensor circuit may be obtained with reference to common knowledge in the related art, which are not repeated hereinafter.

In the present embodiment, the storage device 220 is coupled to the processor circuit 240. The storage device 220 may be a static random access memory (SRAM), a dynamic random access memory (DRAM), a hard disk, a flash memory, or any memory or storage device capable of storing electronic signals or data.

In the present embodiment, the notification device 230 is coupled to the processor circuit 240. The notification device 230 may be a screen, a speaker or a vibration device. The screen may be a display unit providing a display function within a display area of the fingerprint sensor apparatus 200. The display unit may be, but not limited to, a liquid crystal display (LCD), a light-emitting diode (LED), a field emission display (FED), or so forth. The speaker may be a device for outputting sounds. The vibration device may be a device which can generate vibrations for the fingerprint sensor apparatus 200.

In an embodiment, the processor circuit 240 includes, for example, Central Processing Unit (CPU), Microprocessor, Digital Signal Processor (DSP), Programmable Controller, Programmable Logic Device (PLD), or other similar devices, a combination of the said devices, which are not particularly limited by the present disclosure. Further, in an embodiment, the storage device 220 in FIG. 2 may also store a plurality of program codes. These program codes may be executed by the processor circuit 240 to perform the method for sensing a fingerprint of the invention. Alternatively, in an embodiment, the method for sensing a fingerprint of the invention may be implemented as one or more circuits. The invention is not intended to limit whether the method for sensing a fingerprint of the invention is implemented by ways of software or hardware.

In the present embodiment, when the user 100 wants to use the fingerprint sensor apparatus 200 to identify a finger (e.g. a thumb) of the user 100, the user 100 may first use the fingerprint sensor apparatus 200 to execute an enrolment process to enroll the fingerprint of the finger, such that the fingerprint images of the finger are stored into the fingerprint sensor apparatus 200. Thereafter, the fingerprint sensor apparatus 200 may use the stored fingerprint images to identify the finger of the user 100.

To be specific, after the user 100 executes the enrolment process, the notification device 230 of the fingerprint sensor apparatus 200 may notify the user to use a finger to be enrolled to touch the fingerprint sensor apparatus 200. After the user 100 touches the fingerprint sensor apparatus 200 with the finger, the processor unit 430 captures a plurality of local fingerprint images of a fingerprint. The plurality of local fingerprint images include at least one first local fingerprint image and at least one second local fingerprint image.

Figure 3:
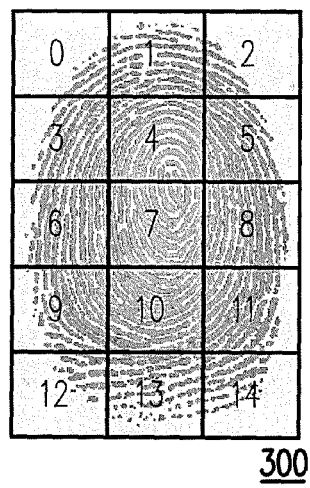
FIG. 3 illustrates a schematic diagram of a plurality of local fingerprint images of a finger according to an embodiment of the invention.

For example, FIG. 3 illustrates a schematic diagram of a plurality of local fingerprint images of a finger according to an embodiment of the invention. Referring to FIG. 3, it is assumed that a global fingerprint image 300 of a finger may be divided into a plurality of local fingerprint images 0~14. The global fingerprint image 300 represents a complete fingerprint image of the finger. Because the size of the fingerprint sensor 210 is smaller than the global fingerprint image 300, the fingerprint sensor 210 does not obtain all of the local fingerprint images 0~14 after an only one touch operation. In other words, because the number of pixels of the global fingerprint image 300 is larger than the number of pixels of the fingerprint sensor, the fingerprint sensor 210 may capture only a part of the local fingerprint images 0~14 after one touch operation. Therefore, the user 100 may perform a plurality of touch operations such that the fingerprint sensor apparatus 200 may capture different parts of the local fingerprint images of the finger.

Figure 4A:
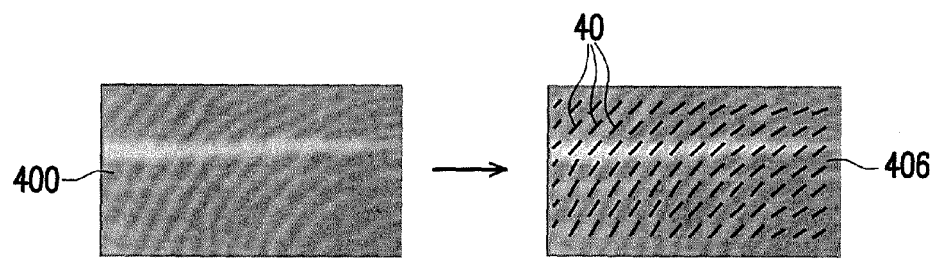
FIG. 4A illustrates a schematic diagram of identifying a first original fingerprint image captured by the fingerprint sensor apparatus according to an embodiment of the invention.

In the present embodiment, when the user 100 performs a first touch operation to touch the fingerprint sensor apparatus 200 with the finger, the fingerprint sensor 210 captures a first original fingerprint image of the finger. The processor circuit 240 further identifies that the first original fingerprint image locates in which local fingerprint images of the local fingerprint images 0~14. For example, FIG. 4A illustrates a schematic diagram of identifying a first original fingerprint image captured by the fingerprint sensor apparatus according to an embodiment of the invention. Referring to FIG. 4A, after performing the first touch operation described above, the fingerprint sensor apparatus 200 may obtain a first original fingerprint image 400 of the finger. In the present embodiment, the first original fingerprint image 400 represents an upper-left part of a fingerprint of the finger. After capturing the first original fingerprint image 400, the processor circuit 240 may generate a direction field 406 for the first original fingerprint image 400.

To be specific, the processor circuit 240 may analyze features of the first original fingerprint image 400 to obtain the direction field 406. The features of the fingerprint image 400 include lines, contours or textures of the fingerprint image 400, which are not particularly limited by the invention. The processor circuit 240 may analyze the features of the first original fingerprint image 400 to obtain the direction field 406 including directions 40 corresponding to the features in the first original fingerprint image 400. However, it should be noted that the method for generating the directions 40 of the direction field 406 may be obtained with reference to common knowledge in the related art of image processing, which are not repeated hereinafter. Besides, the directions 40 of the direction field 406 in FIG. 4A are presented by only three directions. However, the invention is not intended to limit a number of directions in a direction field.

Next, the processor circuit 240 may identify that the first original fingerprint image 400 is an upper-left part of a fingerprint according to slopes or angles of the directions 40. In the present embodiment, the processor circuit 240 identifies that the first original fingerprint image 400 is located in the local fingerprint image 0 and the local fingerprint image 3 of the global fingerprint image 300. The processor circuit 240 may further compute a degree of clarity for each of the local fingerprint images 0~14 of the global fingerprint image 300.

It should be noted that information of the first original fingerprint image 400 located in the local fingerprint image 0 and information of the first original fingerprint image 400 located in the local fingerprint image 3 may be not the same. In an embodiment, a degree of clarity may be computed by using three thresholds. If an amount of the directions 40 corresponding to the first original fingerprint image 400 located in a local fingerprint image is higher than a first threshold, the degree of clarity of the local fingerprint image is set as "100". If an amount of the directions 40 corresponding to the first original fingerprint image 400 located in a local fingerprint image is higher than a second threshold and lower than the first threshold, the degree of clarity of the local fingerprint image is set as "66". If an amount of the directions 40 corresponding to the first original fingerprint image 400 located in a local fingerprint image is higher than a third threshold and lower than the second threshold, the degree of clarity of the local fingerprint image is set as "33". If an amount of the directions 40 corresponding to the first original fingerprint image 400 located in a local fingerprint image is lower than the third threshold, the degree of clarity of the local fingerprint image is set as "0". Specially, the local fingerprint images with degree of clarity set as "100" may be further identified as "clear" by the processor circuit 240. The local fingerprint images with degree of clarity set as "66", "33" or "0" may be further identified as "not clear" by the processor circuit 240.

In the present embodiment, it is assumed that an amount of the directions 40 corresponding to the first original fingerprint image 400 located in the local fingerprint image 3 is higher than the first threshold. Therefore, a degree of clarity of the local fingerprint image 3 is set as "100". Also, an amount of the directions 40 corresponding to the first original fingerprint image 400 located in the local fingerprint image 0 is higher than the third threshold and lower than the second threshold. Therefore, a degree of clarity of the local fingerprint image 0 is set as "33". Besides, a degree of clarity for each of other local fingerprint images which are not covered by the first original fingerprint image 400 is set as "0". In other words, in the present embodiment, the local fingerprint image 3 is identified as "clear" and other local fingerprint images are all identified as "not clear". Specially, it should be noted that the local fingerprint images identified as "clear" are also named as "first local fingerprint images" and the local fingerprint images identified as "not clear" are also named as "second local fingerprint images".

After the processor circuit 240 computes a degree of clarity for each of the at least one first local fingerprint image and the at least one second local fingerprint image, the processor circuit 240 may use two bits to represent each of the degrees of clarity and further stores each of the degrees of clarity to the storage device 220 with the format of two bits. The two bits include a first bit and a second bit. Please refer to TABLE 1, if a degree of clarity of a local fingerprint image is set as "33", the first bit of the degree of clarity may be set as "0" and the second bit of the degree of clarity may be set as "0". If a degree of clarity of a local fingerprint image is set as "100", the first bit of the degree of clarity may be set as "0" and the second bit of the degree of clarity may be set as "1". If a degree of clarity of a local fingerprint image is set as "0", the first bit of the degree of clarity may be set as "1" and the second bit of the degree of clarity may be set as "0". If a degree of clarity of a local fingerprint image is set as "66", the first bit of the degree of clarity may be set as "1" and the second bit of the degree of clarity may be set as "1". Nevertheless, the invention is not intended to limit the bit format representing a degree of clarity and numbers of bits of the bit format.

TABLE 1

|  | Second bit set as "0" | Second bit set as "1" |
|---|---|---|
| first bit set as "0" | 33 | 100 |
| first bit set as "1" | 0 | 66 |

In an embodiment, after the processor circuit 240 computes the degree of clarity for each of the first local fingerprint image and the second local fingerprint image in the global fingerprint image, the notification device 230 may output the degree of clarity for each of the first local fingerprint image and the second local fingerprint image. The degree of clarity may be shown by a display unit of the fingerprint sensor apparatus 200 with a format of percentage such as "0%", "33%", "66%" or "100%". However, the invention is not intended to limit the way of displaying the degree of clarity.

Continuation of the embodiments of FIG. 4A described above, after computing the degree of clarity for each of the local fingerprint image 3 (i.e., the first local fingerprint image) and other local fingerprint images (i.e., the second local fingerprint image) in the global fingerprint image 300, the processor circuit 240 may control the notification device 230 to output a first notification signal to the user 100. The first notification signal indicates where a first location of the local fingerprint image 3 and a second location of the other local fingerprint images locate in the global fingerprint image 300. The processor circuit 240 may further control the notification device 230 to output a second notification signal including a direction information. The second notification prompts the user 100 to perform another touch operation. The direction information prompts the user 100 of the fingerprint to move the finger of the fingerprint such that the fingerprint sensor 210 may capture the second local fingerprint images identified as "not clear" in the first touch operation according to the second notification signal.

In an embodiment, the first notification signal and the second notification signal described above are selected from at least one of a screen notification, a sound notification and a vibrating alert. For example, the first notification signal in the present embodiment is a screen notification such that the user 100 may clearly understand that where the local fingerprint images which are clear and the local fingerprint images which are not clear locate in the global fingerprint image 300. The second notification signal in the present embodiment is a sound notification prompting the user 100 of the fingerprint to move the finger of the fingerprint such that the fingerprint sensor 210 may capture the second local fingerprint images according to the second notification signal. The invention is not intended to limit the type of the first notification signal and the second notification signal.

After outputting the second notification signal, the user 100 may perform a second touch operation to touch the fingerprint sensor apparatus 200 again according to the indication of the second notification signal such that the fingerprint sensor apparatus 200 captures the second local fingerprint images which are not clear.

Figure 4B:
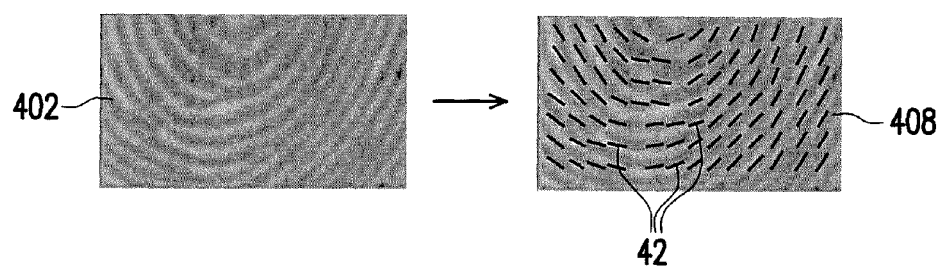
FIG. 4B illustrates a schematic diagram of identifying a second original fingerprint image captured by the fingerprint sensor apparatus according to an embodiment of the invention.

In detail, FIG. 4B illustrates a schematic diagram of identifying a second original fingerprint image captured by the fingerprint sensor apparatus according to an embodiment of the invention. After the user performs the second touch operation, the fingerprint sensor apparatus 200 may capture the second original fingerprint image 402 and generate a direction field 408 of the second original fingerprint image 402 with the operation described in FIG. 4A. The processor circuit 240 may recognize that the second original fingerprint image 402 is a lower-middle part of the fingerprint according to the directions 42 of the direction field 408.

In the present embodiment, it is assumed that the processor circuit 240 identifies that the second original fingerprint image 402 is only located in the local fingerprint image 10 of the global fingerprint image 300. The processor circuit 240 may further perform a process of image stitching for the first original fingerprint image 400 and second original fingerprint image 402 according to the direction field 402 the direction field 406. The processor circuit 240 may further re-compute the degree of clarity for each of the local fingerprint images 0~14 of the global fingerprint image 300 and determines whether at least one local fingerprint image (i.e., third local fingerprint image) of the second local fingerprint image which is identified as "not clear" in the first touch operation is clear after performing the second touch operation.

After the second touch operation described in FIG. 4B, it is assumed that degrees of clarity of the local fingerprint image 3 and the local fingerprint image 10 are both identified as "clear" and degrees of clarity of other local fingerprint images are still identified as "not clear". In the present embodiment, the processor circuit 240 may add the local fingerprint image 10 (i.e., the third local fingerprint image) to the first local fingerprint images which are identified as "clear" after performing the second touch operation. It is because that local fingerprint images other than the local fingerprint image 3 and local fingerprint image 10 are stilled identified as "not clear", these local fingerprint images are still categorized as the second local fingerprint images.

Thereafter, the processor circuit 240 may control the notification device to output a first notification signal to the user 100, the first notification signal indicates where a third location of the local fingerprint image 3 and the local fingerprint image 10 locate in the global fingerprint image 300. The first notification signal also indicates where a fourth location of the local fingerprint images other than the local fingerprint image 3 and local fingerprint image 10 locates in the global fingerprint image 300. The user may further perform another touch operation according to the first notification and the second notification again.

In an embodiment, after the operation of capturing the at least one second local fingerprint image according to the second notification signal, the processor circuit 240 may determine whether there is a local fingerprint image (i.e., third notification signal) of the second local fingerprint images is clear after the current touch operation. If all of the second local fingerprint images are still not clear, the processor circuit may control the notification device 230 to output a notification signal (i.e., third notification signal) to prompt the user 100 to perform another touch operation. The user 100 may further press by the finger again such that the fingerprint sensor 210 captures the at least one second local fingerprint image again.

Figure 5:
FIG. 5 illustrates a schematic diagram of a stitched fingerprint image after performing a plurality of touch operations according to an embodiment of the invention.

FIG. 5 illustrates a schematic diagram of a stitched fingerprint image after performing a plurality of touch operations according to an embodiment of the invention.

Referring to FIG. 5, after performing a plurality of touch operations by the user, the processor circuit 240 may obtain a stitched fingerprint image 500 according to original fingerprint images obtained from all the touch operations. Besides, after each of the touch operation, the processor circuit 240 may determine whether a number of the first local fingerprint images which are identified as "clear" is greater than a threshold or not. If the number of the first local fingerprint image is equal to or greater than the threshold, the processor circuit 240 finishes capturing the at least one second local fingerprint image and stores the at least one first local fingerprint image into the storage device 220 of the fingerprint sensor apparatus 200. Thereafter, the processor circuit 240 may identify the fingerprint of the user 100 according to the first local fingerprint images in the stitched fingerprint image 500. In the present embodiment, the threshold is set as "9". However, the invention is not intended to limit the value of the threshold. Besides, if the number of the first local fingerprint image is still lower than the threshold after a touch operation, the processor circuit 240 would output the first notification signal and the second first notification signal in order to indicate the user 100 to perform another touch operation until the number of the first local fingerprint images is equal to or greater than the threshold.

In an embodiment, after each of the touch operation, the processor circuit 240 may determine whether a size of the stitched fingerprint image 500 is bigger than a threshold or not. If the size of the stitched fingerprint image 500 is equal to or greater than pixel value "256*256", the processor circuit 240 finishes capturing the at least one second local fingerprint image and stores the first local fingerprint images into the storage device 220 of the fingerprint sensor apparatus 200. Thereafter, the processor circuit 240 may identify the fingerprint of the user 100 according to the first local fingerprint images in the stitched fingerprint image 500. However, the invention is not intended to limit the size of the threshold. Besides, if the size of the stitched fingerprint image is still smaller than the threshold after a touch operation, the processor circuit 240 would output the first notification signal and the second first notification signal in order to indicate the user 100 to perform another touch operation until the size of the stitched fingerprint image 500 is equal to or bigger than the threshold.

Figure 6A:
FIG. 6A illustrates a schematic diagram of outputting the first notification signal according to an embodiment of the invention.
Figure 6B:
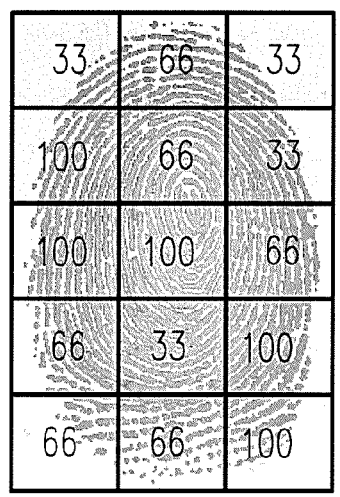
FIG. 6B illustrates a schematic diagram of outputting the first notification signal according to an embodiment of the invention.
Figure 6C:
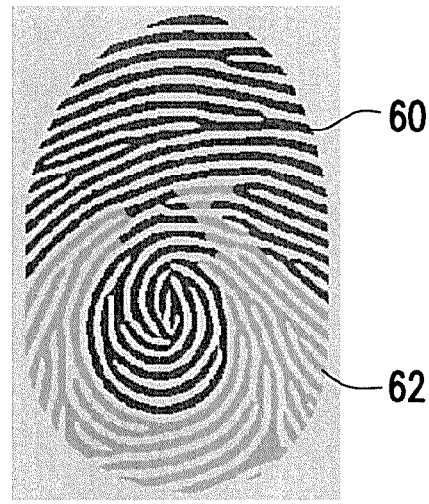
FIG. 6C illustrates a schematic diagram of outputting the first notification signal according to an embodiment of the invention.

FIG. 6A illustrates a schematic diagram of outputting the first notification signal according to an embodiment of the invention. FIG. 6B illustrates a schematic diagram of outputting the first notification signal according to an embodiment of the invention. FIG. 6C illustrates a schematic diagram of outputting the first notification signal according to an embodiment of the invention.

Please refer to FIG. 6A. In an embodiment, the notification device 230 may outputs the first notification signal through a display unit. A location of first local fingerprint images located in the global fingerprint image may be displayed by using thin lines. A location of second local fingerprint images located in the global fingerprint image may be displayed by using thick lines. The user 100 may clearly understand where the location of the second local fingerprint images located in the global fingerprint image is through the thick lines shown by the display unit.

Please refer to FIG. 6B. In an embodiment, the notification device 230 may outputs the first notification signal through the display unit. The display unit may show the degree of clarity for each of the local fingerprint images in the global fingerprint image on the display unit. The user 100 may clearly understand that the location of the second local fingerprint images located in the global fingerprint image through the degree of clarity shown by the display unit. In the embodiment of FIG. 6B, it should be noted that a local fingerprint image with the degree of clarity "0", "33" or "66"

is categorized as one of a local fingerprint image of the second local fingerprint images.

Please refer to FIG. 6C. In an embodiment, the notification device 230 may outputs the first notification signal through the display unit. A location of first local fingerprint images located in the global fingerprint image may be displayed by using a first color 60 painting on the global fingerprint image. A location of second local fingerprint images located in the global fingerprint image may be displayed by using a second color 62 painting on the global fingerprint image. The user 100 may clearly understand where the location of the second local fingerprint images located in the global fingerprint image is through the second color 62 shown by the display unit.

Figure 7:
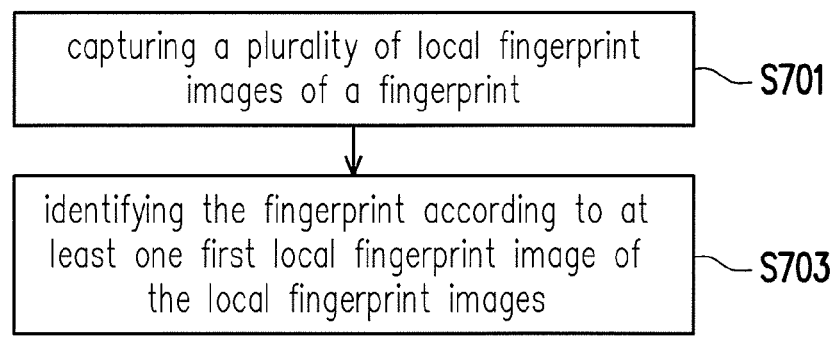
FIG. 7 is a flowchart illustrating steps in a method for sensing a fingerprint according to an embodiment of the invention.

FIG. 7 is a flowchart illustrating steps in a method for sensing a fingerprint according to an embodiment of the invention.

Referring to FIG. 2 and FIG. 7, the method for sensing a fingerprint of the present embodiment is at least adapted to the fingerprint sensor apparatus 200 of FIG. 2, but the invention is not limited thereto.

Taking the fingerprint sensor apparatus 200 of FIG. 2 for example, in step S701, the fingerprint sensor 210 captures a plurality of local fingerprint images of a fingerprint, where the plurality of local fingerprint images include at least one first local fingerprint image and at least one second local fingerprint image. In step S703, the processor circuit 240 identifies the fingerprint according to the at least one first local fingerprint image of the local fingerprint images, where the local fingerprint images form a global fingerprint image of the fingerprint.

Figure 8:
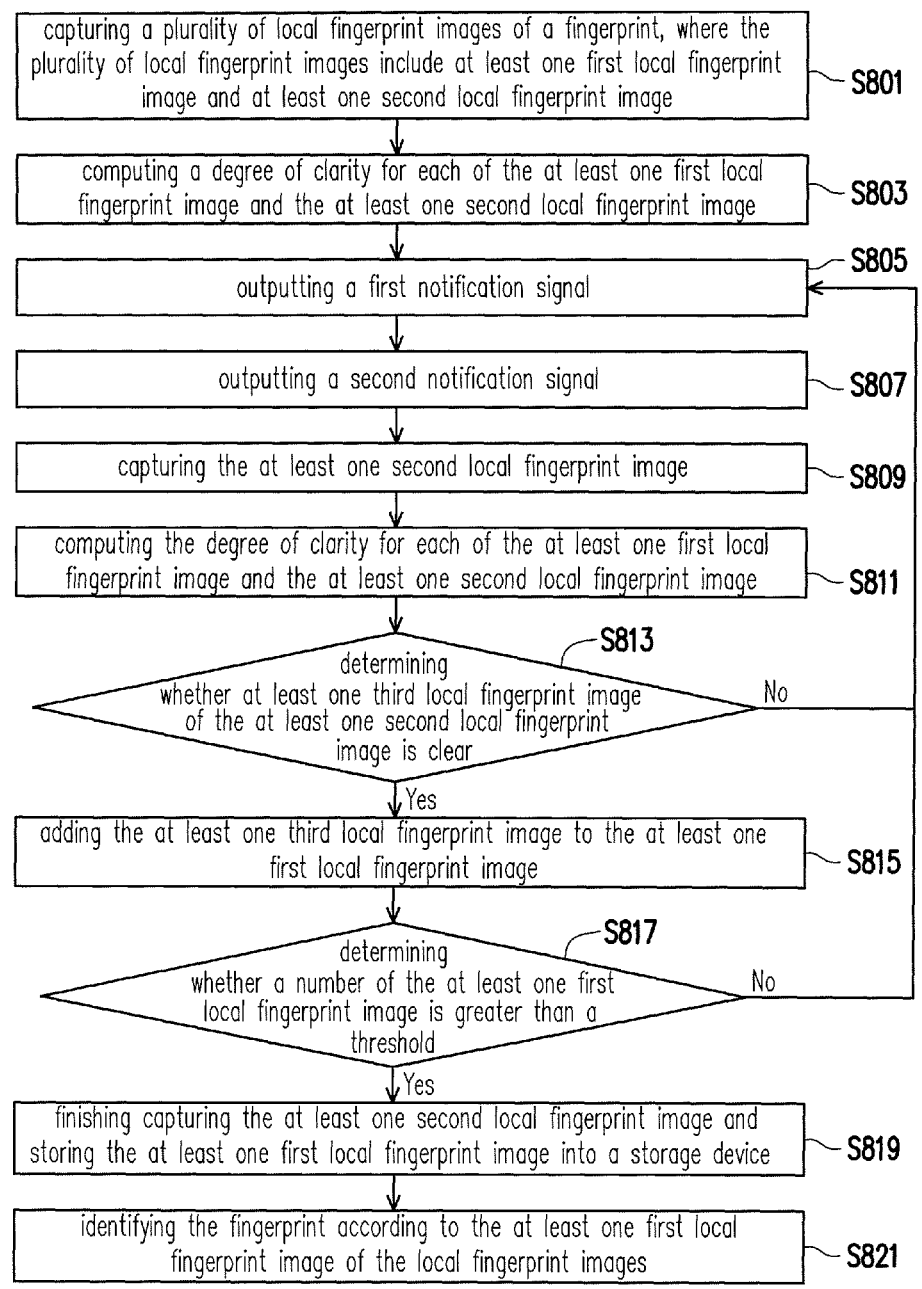
FIG. 8 is a flowchart illustrating steps in a method for sensing a fingerprint according to another embodiment of the invention.

FIG. 8 is a flowchart illustrating steps in a method for sensing a fingerprint according to another embodiment of the invention. Referring to FIG. 2 and FIG. 8, the method for sensing a fingerprint of the present embodiment is at least adapted to the fingerprint sensor apparatus 200 of FIG. 2, but the invention is not limited thereto.

Taking the fingerprint sensor apparatus 200 of FIG. 2 for example, in step S801, the fingerprint sensor 210 captures a plurality of local fingerprint images of a fingerprint, where the plurality of local fingerprint images include at least one first local fingerprint image and at least one second local fingerprint image. In step S803, the processor circuit 240 computes a degree of clarity for each of the at least one first local fingerprint image and the at least one second local fingerprint image. In step S805, the notification device 230 outputs a first notification signal, where the first notification signal indicates where a first location of the at least one first local fingerprint image and a second location of the at least one second local fingerprint image locate in the global fingerprint image. In step S807, the notification device 230 outputs a second notification signal including a direction information, where the direction information prompts a user of the fingerprint to move a finger of the fingerprint such that the fingerprint sensor 210 captures the at least one second local fingerprint image according to the second notification signal. In step S809, the fingerprint sensor 210 captures the at least one second local fingerprint image. In step S811, the processor circuit 240 computes the degree of clarity for each of the at least one first local fingerprint image and the at least one second local fingerprint image. In step S813, the processor circuit 240 determines whether at least one third local fingerprint image of the at least one second local fingerprint image is clear. If the at least one third local fingerprint image is not clear, the method executes step S805 again. If the at least one third local fingerprint image is clear, in step S815, the processor circuit 240 adds the at least one third local fingerprint image to the at least one first local fingerprint image and executes a operation in step S817.

In step S817, the processor circuit 240 determines whether a number of the at least one first local fingerprint image is greater than a threshold. If the at least one third local fingerprint image is not clear, the method executes step S805 again. If the number of the at least one first local fingerprint image is greater than the threshold, in step S819, the processor circuit 240 finishes capturing the at least one second local fingerprint image and stores the at least one first local fingerprint image into the storage device 220. Thereafter, in step S821, the processor circuit 240 may identify the fingerprint according to the at least one first local fingerprint image of the local fingerprint images.

In summary, in exemplary embodiments of the invention, the fingerprint sensor apparatus and the method for fingerprint sensing provide a good user experience and reducing a number of touch operations during the process of a fingerprint enrolment.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A fingerprint sensor apparatus, comprising:
   a fingerprint sensor, configured to capture a plurality of local fingerprint images of a fingerprint, wherein the plurality of local fingerprint images comprise at least one first local fingerprint image and at least one second local fingerprint image;
   a processor circuit, electrically connected to the fingerprint sensor and configured to identify the fingerprint according to the at least one first local fingerprint image of the local fingerprint images,
   wherein the local fingerprint images form a global fingerprint image of the fingerprint; and
   a notification device, electrically connected to the processor circuit, and configured to output a first notification signal to a user,
   wherein the first notification signal indicates where a first location of the at least one first local fingerprint image and a second location of the at least one second local fingerprint image locate in the global fingerprint image.

2. The fingerprint sensor apparatus according to claim 1, wherein
   the notification device outputs a second notification signal comprising a direction information,
   wherein the direction information prompts a user of the fingerprint to move a finger of the fingerprint such that the fingerprint sensor captures the at least one second local fingerprint image according to the second notification signal.

3. The fingerprint sensor apparatus according to claim 2, wherein the first notification signal and the second notification signal are selected from at least one of a screen notification, a sound notification and a vibrating alert.

4. The fingerprint sensor apparatus according to claim 2, wherein after the operation of capturing the at least one second local fingerprint image according to the second notification signal,
   the processor circuit determines whether at least one third local fingerprint image of the at least one second local fingerprint image is clear, and if the at least one third local fingerprint image is clear, the processor circuit adds the at least one third local fingerprint image to the at least one first local fingerprint image.

5. The fingerprint sensor apparatus according to claim 4, further comprising:
a storage device, electrically connected to the processor circuit,
wherein the processor circuit determines whether a number of the at least one first local fingerprint image is greater than a threshold,
if the number of the at least one first local fingerprint image is greater than the threshold, the processor circuit finishes capturing the at least one second local fingerprint image and stores the at least one first local fingerprint image into the storage device.

6. The fingerprint sensor apparatus according to claim 2, wherein after the operation of capturing the at least one second local fingerprint image according to the second notification signal,
the processor circuit determines whether at least one third local fingerprint image of the at least one second local fingerprint image is clear, and
if the at least one third local fingerprint image is not clear, the processor circuit controls the notification device to output a third notification signal to prompt the user to press by the finger again such that the fingerprint sensor captures the at least one second local fingerprint image.

7. The fingerprint sensor apparatus according to claim 1, wherein the processor circuit computes a degree of clarity for each of the at least one first local fingerprint image and the at least one second local fingerprint image.

8. The fingerprint sensor apparatus according to claim 7, further comprising:
a notification device, electrically connected to the processor circuit, and configured to output the degree of clarity for each of the at least one first local fingerprint image and the at least one second local fingerprint image.

9. The fingerprint sensor apparatus according to claim 1, wherein a number of pixels of the global fingerprint image is larger than a number of pixels of the fingerprint sensor.

10. A method for sensing a fingerprint, adapted to a fingerprint sensor apparatus, comprising:
capturing a plurality of local fingerprint images of the fingerprint, wherein the plurality of local fingerprint images comprise at least one first local fingerprint image and at least one second local fingerprint image;
outputting a first notification signal to a user; and
identifying the fingerprint according to the at least one first local fingerprint image of the local fingerprint images,
wherein the local fingerprint images form a global fingerprint image of the fingerprint, and the first notification signal indicates where a first location of the at least one first local fingerprint image and a second location of the at least one second local fingerprint image locate in the global fingerprint image.

11. The method for sensing the fingerprint according to claim 10, further comprising:
outputting second notification comprising a direction information,
wherein the direction information prompts a user of the fingerprint to move a finger of the fingerprint such that the fingerprint sensor apparatus captures the at least one second local fingerprint image according to the second notification signal.

12. The method for sensing the fingerprint according to claim 11, wherein the first notification signal and the second notification signal are selected from at least one of a screen notification, a sound notification and a vibrating alert.

13. The method for sensing the fingerprint according to claim 11, wherein after the step of capturing the at least one second local fingerprint image according to the second notification signal, further comprising:
determining whether at least one third local fingerprint image of the at least one second local fingerprint image is clear; and
if the at least one third local fingerprint image is clear, adding the at least one third local fingerprint image to the at least one first local fingerprint image.

14. The method for sensing the fingerprint according to claim 13, further comprising:
determining whether a number of the at least one first local fingerprint image is greater than a threshold; and
if the number of the at least one first local fingerprint image is greater than the threshold, finishing capturing the at least one second local fingerprint image and storing the at least one first local fingerprint image into the storage device.

15. The method for sensing the fingerprint according to claim 11, wherein after the step of capturing the at least one second local fingerprint image according to the second notification signal, further comprising:
determining whether at least one third local fingerprint image of the at least one second local fingerprint image is clear; and
if the at least one third local fingerprint image is not clear, outputting a third notification signal to prompt the user to press by the finger again such that a fingerprint sensor of the fingerprint sensor apparatus captures the at least one second local fingerprint image.

16. The method for sensing the fingerprint according to claim 10, further comprising:
computing a degree of clarity for each of the at least one first local fingerprint image and the at least one second local fingerprint image.

17. The method for sensing the fingerprint according to claim 16, further comprising:
outputting the degree of clarity for each of the at least one first local fingerprint image and the at least one second local fingerprint image.

18. The method for sensing the fingerprint according to claim 10, wherein a number of pixels of the global fingerprint image is larger than a number of pixels of a fingerprint sensor of the fingerprint sensor apparatus.

* * * * *